Feb. 6, 1962 R. TOWNSEND 3,019,979

ELECTRONIC ADDING CIRCUITS

Filed March 3, 1959 4 Sheets-Sheet 1

INVENTOR
RALPH TOWNSEND
BY [signature]
ATTORNEY

Feb. 6, 1962 R. TOWNSEND 3,019,979

ELECTRONIC ADDING CIRCUITS

Filed March 3, 1959 4 Sheets-Sheet 2

INVENTOR
RALPH TOWNSEND
BY [signature]
ATTORNEY

INVENTOR
RALPH TOWNSEND
BY [signature]
ATTORNEY

Feb. 6, 1962 R. TOWNSEND 3,019,979

ELECTRONIC ADDING CIRCUITS

Filed March 3, 1959 4 Sheets-Sheet 4

INVENTOR
RALPH TOWNSEND
BY Frederick E. Hane
ATTORNEY 3,019,979
Patented Feb. 6, 1962

3,019,979

ELECTRONIC ADDING CIRCUITS

Ralph Townsend, Darien, Conn., assignor to International Computers and Tabulators Limited Filed Mar. 3, 1959, Ser. No. 796,918
9 Claims. (Cl. 235—170)

This application is a continuation-in-part of my application Serial Number 388,751 filed on October 28, 1953, now abandoned and assigned to the same assignees as the present application.

This invention relates to electronic apparatus for adding together two numbers which are represented by serial trains of binary pulses. Each train consists of a succession of groups of pulses, the pulses in each group representing in binary notation a value in a separate denomination of a notation having a radix other than 2. Thus, when the numbers are represented by trains of pulses in binary coded decimal, each group of pulses consists of four pulses representing successively 1, 2, 4 and 8. Although numbers between 0 and 15 can be represented in each such group, in fact representations of the numbers 10 to 15 are not used.

It has already been proposed in United States Patent No. 2,898,043 to add two serial trains of binary coded pulses by using a binary adder, and then correcting the resultant sum pulse train by the addition of "filler" digit pulse groups in a second binary adder. While "filler" digits are fully explained in the above mentioned United States specification, it may be stated that a "filler" digit is equal to the difference between the largest number that can be represented by a pulse group and the radix of notation increased by 1. Therefore, in the case of binary coded decimal, the filler digit is $15-10+1=6$. The circuits for determining which pulse groups require correction are rather complex and are approximately equivalent to a further binary adder.

The object of the present invention is to provide a simplified circuit for adding two serial trains of binary coded pulses.

According to the invention electronic apparatus for adding together two serial trains of binary coded pulse groups has a first adding means for producing the sum of the two pulse trains, a second adding means for producing the sum of the two pulse trains and a "filler" digit pulse train, gating means, controlled by the occurrence of a carry at the end of a pulse group in either adding means, for selecting the sum pulse train from either the first or second adding means, and means for entering an end of pulse group carry from the second adding means into the first adding means.

The invention will now be described, by way of example, with referece to the accompanying drawings, in which.

Figure 1:
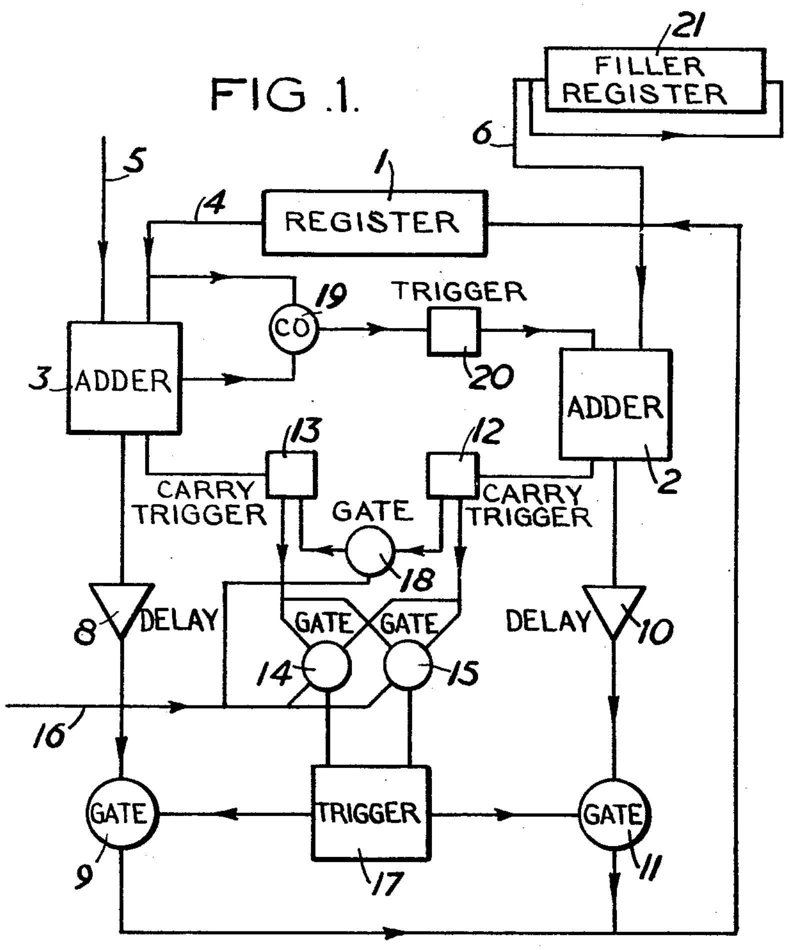
FIGURE 1 is a block diagram of a coded pulse group adder.

The two binary adders are used to form two pulse trains one of which represents, in each denomination, the sum of the two input digits and the other of which represents the sum of the two input digits and the "filler" digit.

The occurrence, in either adder, of a carry at the end of a pulse group is used to control the selection of one or other pulse train for reading out. The rules relating to the addition of "filler" digits in coded group addition are fully set forth in United States Patent No. 2,898,042.

One of the numbers to be added is held in a shifting register 1. For example, in order to hold an eight-digit decimal number, the register comprises thirty two stages; four stages, representing the values 1, 2, 4 and 8 respectively, being required to hold each decimal digit. The values are shifted out of the register in succession, the lowest value of the least significant digit being shifted first. Thus, a number held in the register is made available at the output of the register as a train of pulses, each successive group of four pulses representing one decimal digit, or one denomination of the decimal number. This register is also for storing the sum. The output from the shifting register 1 is fed to a binary adder 3 via a line 4. The pulse train representing the second number to be added is also fed to the adder 3 via an input line 5. The output pulse train from the adder 3, which represents the sum of the two input digits, is fed to a gate 9, through a delay unit 8 which provides a delay sufficient to allow the group of binary pulses relating to one decimal digit to be processed by the adder before being re-entered into the shifting registers 1. Thus, in the case under consideration, since four binary digits are used to express each decimal digit value, the delay required is equal to the time taken for the passage of one pulse group of four binary pulses.

A pulse train representing the sum of the two digits is also fed to a binary adder 2. This pulse train is derived from a coincidence circuit 19 as the contents of shifting register 1 are shifted into the adder 3, and the operation of the circuit 19 for this purpose will be explained. A pulse train representing the "filler" digit in each decimal denomination is derived from a filler digit shifting register 21 and is entered into adder 2 over a path 6 in the same way that pulses are entered into adder 3 from the shifting register 1. The output pulse train from the adder 2 is fed to a gate 11, via a delay unit 10 which provides a delay equal to that provided by delay unit 8. The outputs of the gates 9 and 11 are commoned and connected to the input of the shifting register 1.

The binary adders 2 and 3 are of the type described in United States Patent Number 2,904,252 and assigned to the same assignees as the present application. In this form of adder the reading out of the sum digits is controlled by a train of clock pulses and not by the entry of the digits to be added. In order to keep the circuits as simple as possible it is desirable that the inputs on the lines 5 and 6 should be synchronised. If the normal output from the adder 3 were used as one input for the adder 2 then it would be delayed by one pulse time with respect to the input on the line 6. This difficulty is overcome by providing a separate sum digit output circuit for the adder 3 which allows the sum digit to be entered into the adder 2 substantially simultaneously with the entry of the digits in the adder 3.

In the form of adder described in the above-mentioned patent application, a coincidence and an anti-coincidence circuit are used for comparing one of the entered digits and the stored carry. The result of this comparison is then used to control the transfer of the digit from the register 1, either direct or reversed, as the sum digit. To provide the separate sum digit output for entry into adder 2 a further coincidence circuit 19 is used to compare the digit which is entered from the register 1 with the setting of the coincidence and anti-coincidence circuits 31 and 32 in the adder 3. It is preferable that the resistances described in the application referred to as connecting the coincidence circuit in the adder to the controlling triggers should be replaced by diodes, so that output voltage swing of the coincidence circuit is substantially the same as that provided by the anodes of a trigger in the two states. The anti-coincidence circuit is modified in the same way. This modification is not essential, but it is more convenient to have the coincidence circuit 19 controlled by voltages of substantialy the same level.

The coincidence circuit 19 controls a Schmidt trigger circuit 20 which replaces the trigger circuit, normally used for registering one of the entered digits in the adder 2. The normal state of the Schmidt trigger 20 is such that it represents an entry of a binary zero into the adder 2. It is switched to the other state, to represent a binary one when the coincidence circuit 19 indicates coincidence. The output line of the coincidence circuit 19 is connected to the controlling grid of the Schmidt trigger. When the output voltage is low the trigger remains in the zero state. When the output voltage rises, on coincidence, it becomes sufficiently positive to switch the trigger over to the one state.

The coincidence circuit 19 is so connected that it indicates coincidence when the coincidence circuit in the adder is operative and the controlling digit in the register 1 is a binary one, or when the anti-coincidence circuit is operative and the digit in the register 1 is a binary zero. This is done by connecting the coincidence circuit 19 between the anodes of the controlling trigger in the register 1 and the output lines of the coincidence and anti-coincidence circuits in the adder 3. The voltages on these two output lines are substantially the same as those which would be derived from the anodes of a trigger which was set to one or zero for coincidence or anti-coincidence in the adder. This results in the trigger 20 being set to represent the correct sum digit and since the setting is not dependent on the clock pulse timing it is substantially immediate.

The adder 2 has a carry storage trigger 12 and the adder 3 has a carry storage trigger 13. At the end of a pulse group the trigger 13 will be set on if the sum of the entered digits alone exceeds 15, while the trigger 12 will be set on if the sum of these digits plus the filler exceeds this value. Hence if either of these carry stores 12 and 13 is set on to indicate a carry at the end of a pulse group, then the sum of the entered digits represented by this pulse group must be greater than the radix of rotation. This means that the sum of the two entered digits plus the "filler" digit is required and not the sum of the two digits alone. In other words the output from the adder 2 should be selected for feeding to the register 1 for this pulse group. It will be appreciated that the setting on of the trigger 12 will provide an indication that the sum of the entered digits equals or exceeds the denominational radix and that this trigger alone may be used to control the selection of the appropriate adder output. In the embodiment shown, however, it has been preferred to use standardised adding arrangements to be described hereinafter, and it is convenient to utilize the output from either of the triggers 12 or 13 to control this selection.

A gating arrangement 14 is controlled by both the carry stores 12 and 13 and by pulses on a line 16, which occur after every pulse group. The arrangement 14 consists of an OR gate responsive to signals from either carry store 12 or 13, the output of this stage being connected to an AND gate which is also controlled by pulses from the line 16. Thus, the arrangement 14 produces an output pulse only when a pulse occurs on the line 16 and either one or both of the carry stores is set to one. This output pulse is fed to one grid of a trigger stage 17 to set the trigger to zero whenever a pulse group requires the addition of a "filler" digit.

A gate 15 is a conventional AND gate and is also controlled by the two carry stores 12 and 13 and the pulses on the line 16. This gate is operative only when a pulse occurs on the line 16 and both of the carry stores are set to zero. The output pulses from the gate 15 are applied to the other grid of the trigger stage 17 to set it to one.

The two gates 9 and 11, are controlled by the trigger stage 17. When the trigger stage is set to zero the gate 11 is operative and passes the output from the adder 2 to the register 1. When the trigger stage 17 is set to one, the output of the adder 3 is passed to the register 1 by the gate 9. The delay units 8 and 10, provide the delay equal to the passage of one decimal denominational group of four binary digits which is necessary to allow the trigger 17 to select a pulse group from the correct adder for entry into the register 1, after the trigger has been set under control of the end of pulse group carries.

If the sum of two pulse groups on lines 4 and 5 is less than the maixmum capacity of the group, but greater than the radix of notation, a carry will be registered by the carry store 12, but not by the carry store 13, at the end of the pulse group. This means that the pulse group must have the "filler" digit added to it and that there will be a carry to be added into the succeeding pulse group. Consequently the store 13 must be set at one to register a carry, if at the end of the group, the store 12 is set to one. This is effected by a double diode gating circuit 18 connected between the stores 12 and 13 and conditioned if the trigger 12 is set to allow the trigger 13 to be similarly set by the pulses on the line 16.

If a single radix of notation, such as decimal, is in use, then the "filler" digit pulse train may be stored in a shifting register 21 similar to the register 1. If however several different systems of notation such as sterling and weights and measures are employed it is convenient to take the "filler" digit pulse train from storage on a magnetic drum which enables several different pulse trains to be easily selected. The pulse train on the line 5 may be derived from a shifting register, magnetic drum, or any other form of storage which may be synchronised with the remainder of the circuit.

Figure 2:
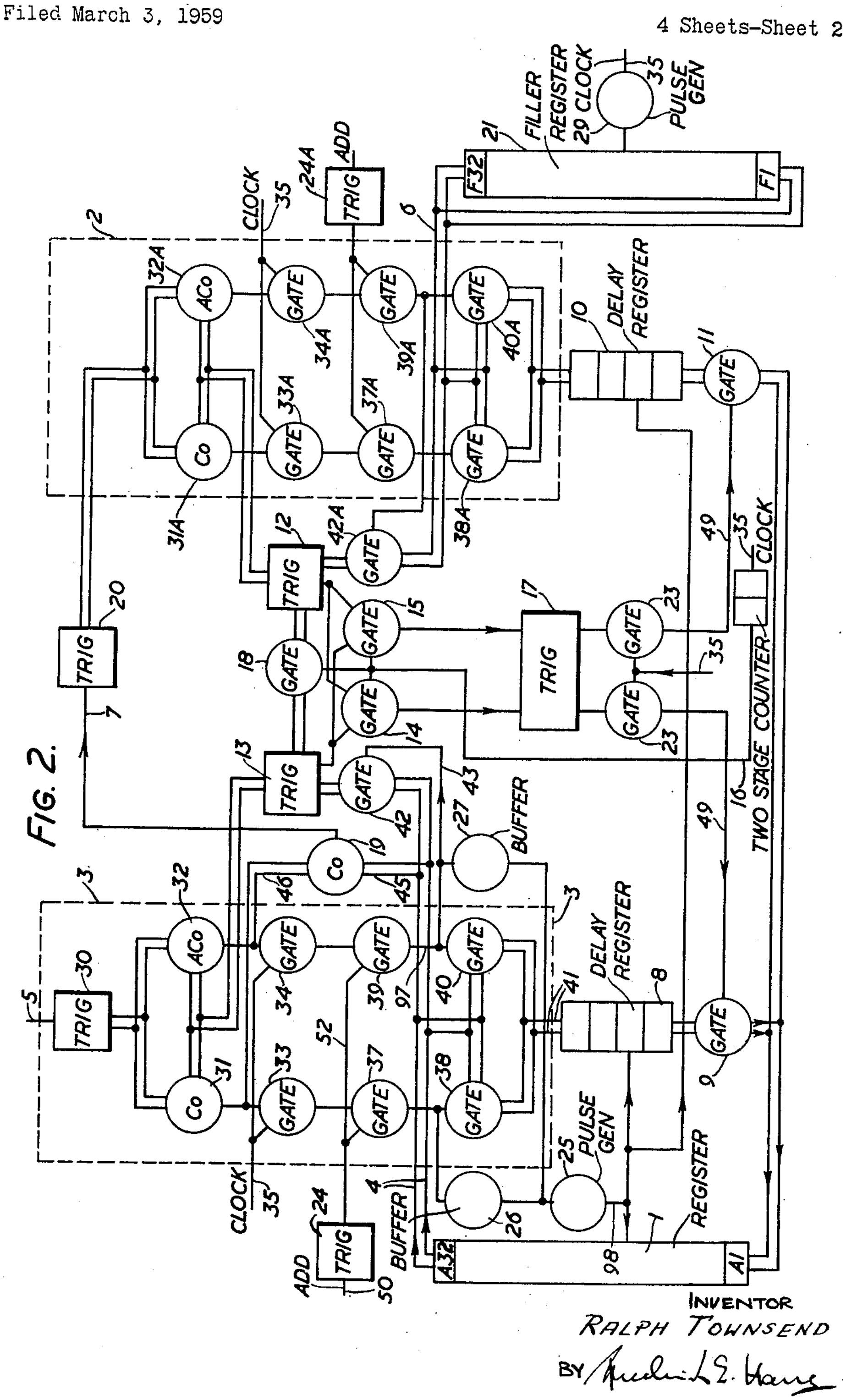
FIGURE 2 shows the apparatus of FIGURE 1 in greater detail.

The binary adders 2, 3, are fully described and illustrated in the before-mentioned U.S. Patent No. 2,904,252, and assigned to the same assignees as the present application, and only that part of the circuit necessary for a proper understanding of the present invention is here illustrated and described; reference should be made to the said application for a fuller description of the circuit. FIGURE 2 shows in schematic form the manner in which the various elements of the above-mentioned application are used in the present arrangement. It has been preferred, for the sake of clarity, to show peripheral and common elements separately from the adders proper since the output from the adders is in the present arrangement subjected to delay in the delay units.

The incoming pulse train on line 5 is applied to a trigger 30 which is set to one or other state depending on whether the incoming digit is one or zero. The settings of trigger 30 and the carry storage trigger 13 are compared by a coincidence circuit 31 and an anticoincidence circuit 32. According to whether triggers 13, 30 are in the same or opposite states, the circuit 31 or the circuit 32 applies a priming control voltage to a gate circuit 33 or 34 respectively. A train of timing or clock pulses is also applied to the gate circuits 33, 34 by a line 35. These clock pulses are derived from a suitable source in the conrtolling apparatus and their frequency is the same as that of the incoming pulses on line 5. The controlling apparatus is, for example, a computer. The pulses on line 16 are, as described, timed to occur after every pulse group to allow the trigger 17 to be set to control the output from the delay units 9 and 11 to the shifting register. Since, in the case of the binary coded decimal operation of the adder 3, each pulse group consists of four binary digit representations, the pulses on line 16 occur after every fourth clock pulse. Thus, these pulses may conveniently be derived from a two-stage binary counter, such as 36, whose input is connected to the clock pulse supply line 35.

Assuming for the moment that the triggers 13, 30 are in agreement, the gate valve 33 will be primed by a voltage from the coincidence circuit 31 and, when it receives a pulse via the line 35, an output pulse is produced which is fed via a gate 37 to a double diode gate 38. Similarly, any output pulse from gate 34 occurring when the triggers 13, 30 are in disagreement is applied through a gate 39 to a second double diode gate 40. Gates 37, 39 are controlled by a trigger 24 which is set by an "add" control signal from the controlling apparatus over a line 50 to open gates 37, 39 for the duration of the shifting of the groups of binary digits, each group representing one denomination of the value held in the shifting register 1, into the adder 3 plus the time required for shifting one further group. This is because, in the case of a binary coded decimal value, each denomination of the value is represented by a group of four binary digits and the delay register in the output of each adder also holds one group. Thus, during the entry of the first group into the adder 3, zeros will be shifted into the stages of the shifting register 1 which originally held the group representing the highest decimal denomination. The additional time required allows the final group to be shifted from a delay register into the shifting register 1 at the conclusion of the adding operation. The output of gate 38 is connected by lines 41 to the delay register 8 and the output from this register then passes to the gate 9 which is in turn connected to the grids of the first stage A1 of the shifting register 1. By way of example, this register is shown as having 32 stages. Gate 40 is also connected through lines 41 to the delay register 8. Gates 38, 40 are controlled through the lines 4 from the last stage A32 of the register.

Shifting of register 1 is effected by shift pulses derived from a pulse generator 25 which is connected to the outputs from gates 37, 39 through buffer valves 26, 27 respectivley. Since the delay registers 8 and 10 are required to be shifted in synchronism with the shifting of register 1, the necessary shift pulses may conveniently be derived from the same pulse generator.

Lines 4 are also connected to a gate 42 controlling input to the carry storage trigger 13. Gate 42 is controlled by the output from the anti-coincidence gate 39 through the line 43. The operation of the binary adder 3 is as follows:

According as to whether agreement or disagreement is found between the triggers 13, 30, gate 38 or gate 40 is opened and the first stage of the delay register 8 is set either the same as or opposite to the setting of the stage A32 in dependence upon which gate 38 or 40 is opened. After four shift pulses i.e. after the binary digits representing a single decimal denomination have been processed, this setting reaches the last stage of the delay register. Assuming that gate 9 has at this time been opened by the trigger 17, the setting of this last stage will be shifted into the stage A1 of the register 1 by the next shift pulse. If agreement between triggers 13, 30 has been found, gate 42 is not impulsed through line 43 and the carry storage trigger 13 is left in its original state. If, on the other hand, disagreement has been found, gate 42 is opened so that carry storage trigger 13 is brought into the same state as the last stage A32 of the register 1. The delay register 8 ensures that the shifting of output from the adder 3 back into the register 1 is delayed to allow the entire group of binary digits of a decimal denomination to be processed before any re-entry into the register takes place. Thus, since these binary digits are held in the delay register 8, the new carry will be registered in trigger 13 one pulse group before stage A1 of register 1 is required to register the new sum digit. This delay enables the circuit as a whole to test whether the sum from binary adder 3, or that from binary adder 2 is to be fed into the register 1.

Binary adder 2 is generally similar to binary adder 3 and corresponding elements are indicated by the addition of the letter A. In this case, however, the input trigger corresponding to the trigger 30 of adder 3, is replaced by the trigger 20. The trigger 20 is operated by the impulses on line 7 and the setting of the trigger is compared in the coincidence circuit 31A and anti-coincidence circuit 32A with the setting of the carry storage trigger 12. The trigger 12 is connected to the adder 2 in the same way that the corresponding carry storage trigger 13 is connected to the adder 3. The shifting register associated with the adder 3 is the filler register 21. Since the two adders are required to operate in synchronism the filler register is conveniently shifted by the direct application of clock pulses from the line 35 applied to a suitable pulse generaotr 29. The trigger 12 is supplied with pulses through the gate 42A from the filler register 21, gate 42A being controlled by the output from the anti-coincidence gate 39A. The pulses from the filler register 21 are also applied in common to the gates 38A, 40A. Gates 37A, 39A are controlled by trigger 24A. The trigger 24A corresponds to the control trigger 24 of adder 3 and is set by the computer to allow the adder 2 to operate. However, since the most significant digit of the sum must be less than the radix of notation unless the capacity of the shifting register 1 has been exceeded, the final transfer required from the adder 2 cannot normally occur later than the transfer of the penultimate group into the shifting register 1. Thus the control trigger 24A is required to open the gates 37A, 39A for a time one group less than is the case for the adder 3. That is, the gates are open for the time taken to shift the contents of the shifting register 1 out of that register. The operation of the adder 2 is generally similar to that of adder 3 and can be summarised as follows:

When the values stored in 12, 20 are the same, gate 38A is opened and the first value registered in register 21 is applied through lines 41A to the delay register 10 and, if gate 11 is open, to the first stage A1 of the register 1. At the same time, gate 42A, which corresponds to the gate 42 of adder 3 and is operated in a similar way by the output of the anticoincidence circuit 32A, will be closed and the value stored in the carry storage trigger 12 will be left unaltered. If, on the other hand, the settings of triggers 20, 32A are not the same, gate 40A will be open to cause the first stage of the delay register 10 to be set to the opposite setting to that in which the last stage (F32) of the register 21 was set. Subsequently, at the end of the pulse group relating to the decimal denomination, the settings of the carry storage triggers 12 and 13 will be sampled, and if either are set to register a one the contents of the delay register 10 will be shifted by the opening of the gate 11 into the shifting register 1. At the same time, gate 42A will be opened to cause the trigger 12 to be set to the same setting as that of the last stage of register 21.

If the output from adder 3 appearing on lines 41 were used as the input on line 7 to adder 2, it would be delayed by one pulse time with respect to the input on lines 6. To avoid this difficulty, the separate sum digit output circuit for adder 3 is provided as described, to allow the sum digit on line 7 to be entered into adder 2 substantially simultaneously with the entry of the digits in the adder 3. The coincidence circuit 19 compares the digit entering the adder 3 from register 1 on the lines 4 with the setting of the coincidence and anti-coincidence circuits 31, 32 of adder 3. The digit from register 1 is applied to coincidence circuit 19 through lines 45 connected to lines 4 and coincidence circuit 19 is also connected to the outputs of circuits 31, 32 through lines 46. In the said application No. 344,713, resistances are shown as connecting the coincidence circuit 31 to the controlling trigger 30 and it is preferred that in the present instance these resistances should be replaced by diodes so that output voltage swing of the coincidence circuit 31 is substantially the same as that provided by the anodes of a trigger in the two states. The anti-coincidence circuit 32 is modified in the same way. This modification is not essential but it is more convenient to have the coincidence circuit 19 controlled by voltages of substantially the same level.

The coincidence circuit 19 controls the Schmidt trigger 20 of adder 2. The normal state of this Schmidt trigger 20 is such that it represents an entry of a binary zero into the adder 2. It is switched to the other state, to represent a binary one when the circuit 19 indicates coincidence. The output line of the coincidence circuit 19 is connected to the controlling grid of the Schmidt trigger. When the output voltage is low the trigger remains in the zero state. When the output voltage rises on coincidence, it becomes sufficiently positive to switch the trigger over to the one state.

The coincidence circuit 19 is so connected that it indicates coincidence when the coincidence circuit 31 in the adder is operative and the controlling digit in the register 1 is a binary one, or when the anti-coincidence circuit 32 is operative and the digit in the register 1 is a binary zero. This is done by connecting the coincidence circuit 19 between the anodes of the controlling trigger A32 in the register 1 and the output lines of the coincidence and anti-coincidence circuits 31, 32 in the adder 3. The voltages on these two output lines are substantially the same as those which would be derived from the anodes of a trigger which was set to one or zero for coincidence or anti-coincidence in the adder. This results in the trigger 20 being set to represent the correct sum digit and since the setting is not dependent on the clock pulse timing it is substantially immediate.

The circuits of the individual elements shown in FIGURE 2 are fully described in the said U.S. Patent No. 2,904,252. The following description, however, reviews the circuit elements used.

Figure 7:
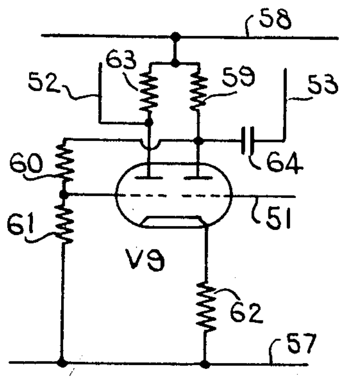
FIGURE 7 is a circuit diagram of a Schmidt trigger.

The elements 24, 24A and 30 are Schmidt trigger circuits and since these are similar only the trigger 24 will be described with reference to FIGURE 7.

The trigger comprises a double triode V9 of which the right hand grid is connected directly by line 51 to the computer control circuits. The left hand grid is connected to the junction of two resistors 60 and 61 which, together with resistor 59 form a potentiometer between a H.T. positive supply line 58 at approximately 150 volts and a H.T. negative line 57. This grid is therefore held positive and in the "off" condition of the trigger the left-hand half of the valve is conducting. Current flows through a cathode resistor 62 so that the cathode of the valve is held just above the potential of the left-hand grid. The normal potential of line 51 is less than this cathode potential, so that the right-hand half of the valve is non-conducting. Due to an anode resistor 63 the line 52, which is connected to the left-hand anode, is maintained at approximately 50 volts less than the H.T. supply voltage.

When the computer receives an "Add" instruction the potential of line 51 (and consequently the right-hand grid) is raised above that of the left-hand grid. As a result, the right hand half of the valve now conducts and raises the potential of the cathode sufficiently to cut off current in the left-hand half of the valve and line 52 rises to H.T. potential. The right-hand anode of the valve is connected to the H.T. line 58 through a resistor 59 so that the anode potential drops when the valve conducts and a negative pulse is fed via a condenser 64 to line 53. This pulse is used to control the carry storage trigger 13.

The line 11 is connected to condition the gates 37 and 39. Thus, provided that the change of potential of line 51 is above a certain minimum value sufficient to switch the trigger from the "off" to the "on" condition, the change of potential of the line 52 will be of a fixed value independent of variations in the potential of the line 51.

Figure 3:
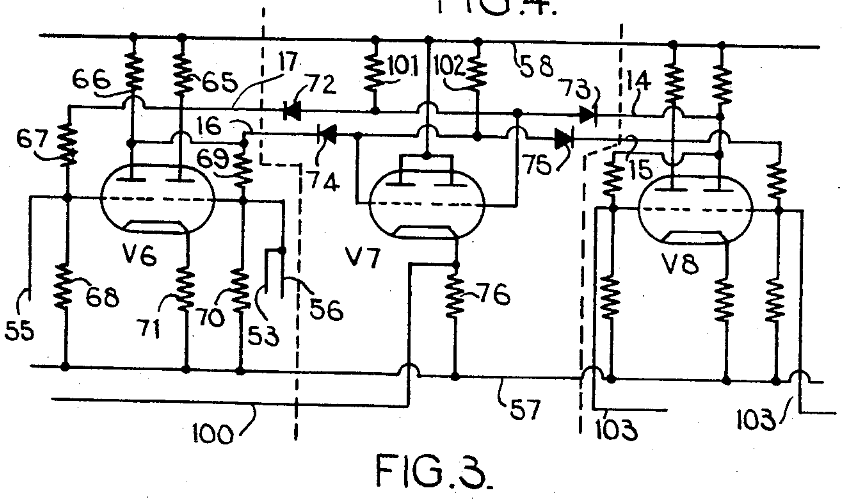
FIGURE 3 is a circuit diagram of a coincidence circuit and the associated trigger stages.

The carry storage triggers 12 and 13 and the trigger 17 are generally similar to those used in the shifting register and to the trigger 30 for storing the incident digit. The trigger 13 will be described. It is of known form, employing a double triode V6 (FIGURE 3) with the grids and anodes D.C. cross-coupled to obtain two stable conductive states. The left-hand anode of the valve is connected to the H.T. line 58 through a resistor 66 and to the right-hand grid through a resistor 69. The right-hand anode is connected to the H.T. line 58 through a resistor 65 and to the left-hand grid through a resistor 67. The two grids are connected to the line 57 through resistors 70 and 68 respectively and the cathode is connected to line 57 through a resistor 71.

The convention will be adopted that a trigger is in the "off" state when the left-hand half of the valve is conducting and the right-hand half is cut off.

Accordingly, when the trigger 12 is "off" the left-hand grid will be at a potential determined by the potentiometer formed by the resistors 65, 67 and 68 and the cathode will be a little above this potential. The potential of the left-hand anode is approximately 50 volts and of the right-hand anode 100 volts. Consequently, the right-hand grid which is connected to the left-hand anode, will be below the cathode potential, maintaining the right half of the valve non-conducting.

The trigger is switched from one state to the other by applying a negative pulse of sufficient amplitude to the grid of the conducting half of the valve to cut if off and thus allow the other half of the valve to conduct.

The state of the carry trigger 13 may be changed at the beginning of an adding operation by a pulse on line 53 from the Schmidt trigger 24 or during the operation by a pulse on lines 55 or 56 from the diode gating circuit 42.

The trigger 13 is similar to the trigger 12 and is controlled in a similar way by signals from the trigger 24A and the gating circuit 42A.

The incident digit trigger 30 consists of a double triode V8 which is similarly connected to the valve V6 except that only two lines, the lines 103, are provided to alter the state of the trigger. As each digit is read out from the computer storage it controls the impulsing of one of the lines 103. If the digit is zero, a negative pulse is fed to the right-hand grid which will switch the trigger "off" if it is already "on" or will leave it "off." If the digit is a "one," the left hand grid receives a pulse which will switch the trigger from "off" to "on" or leave it "on." The trigger 17 is similar to the trigger 30.

The coincidence and anticoincidence circuits 31, 32 and 31A, 32A are similar. The circuits 31 and 32 which compare the two triggers 30 and 13, will be described. The coincidence circuit 31 consists of the double triode V7 and the parts shown between the dotted lines of FIGURE 3. The left-hand grid of V7 is connected through a diode 74 (which is used as described instead of the resistor shown in the patent application referred to above) to the left-hand anode of V6 and through a diode 75 to the left-hand anode of V8. The right-hand grid of V7 is connected through a diode 72 to the right-hand anode of V6 and through a diode 73 to the right-hand anode of V8. The two anodes of V7 are commoned and connected to the H.T. line 58 and the cathode is connected through a resistor 76 to the line 57. The grids of V7 are connected through resistors 101 and 102 respectively to the line 58. With these connections the cathode of V7 will be at a higher potential when the triggers 4 and 8 are in the same state than when they are in dis-similar states. For example, if the triggers are both off, both left-hand anodes will be at low potential and the left-hand grid of V7 will be held at low potential. Both right-hand anodes, however, are at high potential with the result that the right-hand grid of V7 is at high potential and the right hand side of V7 conducts, raising the potential of the cathode. However, if the triggers are dis-similar, each grid of V7 is held at a low potential by the conduction of that diode associated with the anode at low potential, so that in this case the cathode potential is held at a low value. Hence a line 100 connected to the cathode of V7 rises in potential when the two triggers are in the same state.

The anti-coincidence circuit 32 comprises a similar arrangement to that of the coincidence circuit 31 except that the diodes corresponding to diodes 73 and 75 are connected to the left-hand and right-hand anodes of V8 respectively. With these connections the cathode of V7 rises when the triggers are in opposite states.

The coincidence circuit 19 is similar to the coincidence circuit 31.

Figure 8:
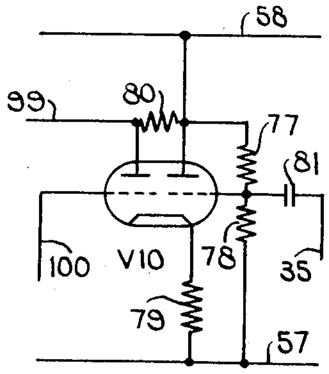
FIGURE 8 is a circuit diagram of a gate circuit.

The gating circuits 33, 34, 37, 39 and the corresponding circuits 33A, 34A, 37A and 39A of adder 2 are similar and the circuit 33 only will be described in detail. This consists of a double triode V10 (FIGURE 8). The right hand grid of the triode is connected to the junction of two resistors 77 and 78 which form a potentiometer between the H.T. lines 57 and 58. This normally maintains the grid at approximately 110 volts. The right-hand anode is connected to the line 58 and the common cathode to the line 57 through a resistor 79. Consequently, the cathode is held at a little more than 110 volts positive. The left-hand grid is connected to the line 100 from the coincidence circuit 31 and the anode is connected through a resistor 80 to the line 58. The potential of the line 100 never rises to 110 volts so that normally the left-hand half of the valve is non-conducting.

The line 35 carrying the clock pulses is connected to the right-hand grid through a capacitor 81. When a negative going clock pulse of approximately 30 volts amplitude is applied to the right-hand grid, the grid and cathode will tend to drop to 80 volts positive. If the line 100 is at its low-potential state the left half of the valve will still not conduct. If, however the line 100 is at its high-potential state the cathode will fall to approximately the same value and be maintained there by conduction occurring in the left-hand half of the valve. When this happens the voltage of the left-hand anode will drop, producing a negative output pulse on line 99.

This negative pulse acts as the input pulse for the right-hand grid of the gating circuit 37 while the positive priming voltage on the left-hand grid of this gating circuit is provided by the trigger 24.

The gates 23 are similar to the gate 33, the priming voltage being derived from the trigger 17 and negative pulses being applied from the clock pulse supply line 35.

The buffers 26 and 27 consist of amplifying stages isolated from the succeeding pulse generator circuit by means of diodes. Each stage consists of a triode. The grids of these triodes receive the negative output pulses from the gating circuits 37 and 39. The valves have only a small standing bias so that positive going output pulses are produced at each anode.

Each isolating diode has its anode connected to the output of one of the amplifier stages and the cathodes of the diodes are commoned and connected to the input of the pulse generator 25.

Figure 4:
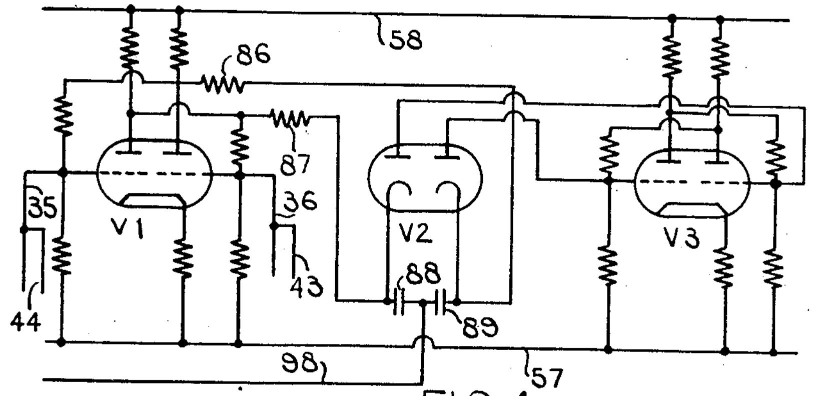
FIGURE 4 is a circuit diagram of two adjacent stages of a shifting register.

The shifting registers 1 and 21 and the delay registers 8 and 10 are all shifting registers comprising trigger stages similar to the carry storage trigger 12. The first two stages A1 and A2 of the register 1 are shown in detail in FIGURE 4. The left and right hand anodes of the first stage V1 are connected through resistors 87 and 86 to the cathodes of a pair of diodes V2, the anodes of which are connected to the right and left-hand grids respectively of the second stage V3. The cathodes of the diodes are each connected to a line 98 through capacitors 88 and 89 respectively. The line 98 is the shift pulse line carrying pulses derived from the pulse generator 25 (FIGURE 2).

The anode potential of one half of the trigger may be either approximately 50 or 100 volts and the corresponding grid potentials are approximately 33 or 22 volts. Hence, for the various combinations of states of the stages A1 and A2, the cathode to anode potential differences of the left and right-hand sides of V2 will be as set out below:

| A1 | A2 | L.H.S. of V2 | R.H.S. of V2 |
|---|---|---|---|
| On | On | 100−33=67 | 50−22=28 |
| Off | On | 50−33=17 | 100−22=78 |
| On | Off | 100−22=78 | 50−33=17 |
| Off | Off | 50−22=28 | 100−33=67 |

If, now, a negative going pulse of approximately 60 volts amplitude is applied to line 98, only one side of V2 will conduct for any particular combination of states, that side having the smaller cathode to anode potential. When the triggers are in different states, the negative pulse is fed, through V2 to the grid of A2 which is at 33 volts, so switching A2 over the to the same state as A1. When the triggers are in the same state the negative pulse is fed to the grid of A2 which is at 22 volts, so that it is merely driven even further below the other grid and the trigger remains in the same state.

A similar diode circuit is connected between A2 and the next stage, and so on, up to A32 the line 98 being connected in common to all the diode circuits so that a single pulse on line 98 causes the setting of the register to be shifted up one stage, the previous setting of A32 being lost.

Figure 5:
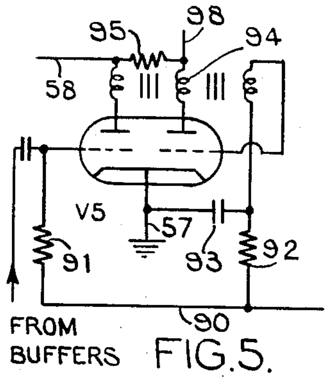
FIGURE 5 is a circuit diagram of a pulse generator.

The pulse generator 25 comprises a blocking oscillator of known form. The positive triggering pulse from the buffers 26 or 27 is applied through a capacitor to one grid of a double triode V5 (FIGURE 5). The grid is normally held below cut-off by a connection through a resistor 91 to a negative bias line 90. The pulse of anode current produced by the input pulse passes through one winding of a transformer 94. The second grid of V5 is connected through a second winding of the transformer 94 and a resistor 92 to the bias line 90 and the junction of the winding and the resistor is by-passed to line 57 by a capacitor 93. The corresponding anode is connected through a third winding of the transformer 94 and a resistor 95 to the H.T. line 58.

The pulse of anode current in the first winding induces a voltage in the second winding so that the grid connected to it is brought above cut-off. The second half of the double triode then acts as a blocking oscillator by regeneration between the second and third windings to produce a large output pulse. The time constants of the cricuit are so chosen that the output on line 98 connected to the junction of the resistor 95 and the third winding of the transformer is a single negative going pulse.

Figure 6:
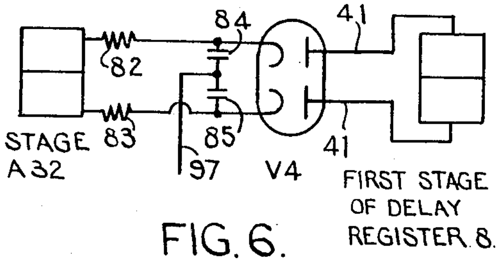
FIGURE 6 is a circuit diagram of a double diode gate.

The gating circuits 9, 11, 18, 38, 38A, 40, 40A and 42 are similar and are conditioned by an input pulse to pass the setting of one trigger stage to another. The gating circuit 40 will be described in detail. The left and right-hand anodes of the trigger comprising the stage A32 of the shifting register 1 (FIGURE 2) are connected through resistors 82 and 83 (FIGURE 6) to the cathodes of two diodes V4. The anodes of the diodes are connected by the lines 41 (FIGURES 2 and 6) to the left-hand and right-hand grids respectively of the double triode trigger forming the first stage of the delay shifting register 8. The cathodes of the diode V4 are connected through capacitors 84 and 85 to the gate control line, in this case line 97 (FIGURES 2 and 6). By comparison with the table given in the description of the shifting register it will be apparent that a 60 volt negative pulse on line 97 will be effective to change the state of the delay register trigger only when this trigger and the stage A1 are in the same state. Hence the diode gate 40, when it is operative ensures that the setting of the delay register trigger is the inverse of the setting of A32.

The gating circuit 40A (FIGURE 2) is, of course, the same as the gating circuit 40. The remaining gating circuits 9, 11, 18, 38, 38A and 42 are similar to the circuit 40, except that the connections from the diode anodes to the trigger grids are the opposite of those described for the circuit 40, so that the operation of these circuits is similar to that of the double diodes in the shifting register.

The gates 14 and 15 are modifications of the gates such as the gate 33 shown in FIGURE 8. The negative pulses on line 16 are applied to the line corresponding to the line 35 of the figure.

In the case of the gate 14, the left-hand anodes of both triggers 12 and 13 are connected through diodes to the left-hand grid of the gate valve corresponding to the valve V10 shown. Thus, these diodes form an OR gate circuit and the negative going output pulse is obtained on the anode output line corresponding to the line 99 if either or both triggers 12 and 13 are set on. This output pulse is applied through a capacitor to the right-hand grid of trigger 17 to set if off or to maintain it in this condition if it is already off.

In the case of gate 15 the left-hand grid of the gate valve is fed by an AND gate arrangement. This grid is connected to a potential dioding resistance network which determines the operating potential of the grid to be approximately 100 volts. However, the grid is also connected to two diodes which are separately connected through resistors to the negative supply line 57. The values of these resistors are chosen in the conventional manner so that the grid is maintained at a low potential by the conduction of either diode. The diodes are also separately connected to the right-hand anodes of the triggers 12 and 13, so that if either of the triggers is set on the corresponding diode is prevented from conducting. Hence the left hand grid of the gate valve is allowed to rise only if both triggers are set off. The output pulse from the gate valve is applied through a capacitor to the left-hand grid of the trigger 17 to set it on.

What is claimed is:

1. Electronic apparatus for adding together two serial trains of binary pulse groups applied thereto, each group representing a single denomination of a notation having a radix greater than two, like denomination groups of both trains being applied concurrently, said apparatus comprising first adding means for producing a first sum pulse train of corresponding denominational groups from said applied trains, concurrently operated second adding means for producing a second sum pulse train from said first sum pulse train and a single pulse train of "filler" digit representing groups, indicating means operated in response to the occurrence of a carry from said second adding means, gating means operative to selectively read out from said first and second adding means like denominational groups of said first and second sum pulse trains, means responsive to the operation of said indicating means at the end of a denominational pulse group for controlling the operation of the gating means such that a pulse group of said second sum pulse train is read out in response to the operation of said indicating means and a pulse group of said first sum pulse train is read out in response to non-operation of said indicating means and means operated in response to the operation of said indicating means at the end of a denominational pulse group for correcting the next following denominational group of sum train pulses produced by said first and second adders by the addition of one.

2. Electronic apparatus for adding together two value representing serial trains of binary pulse groups applied thereto, each group representing a digit in a single denomination of a notation having a radix greater than two, groups representing digits of like denominational significance of both trains being applied concurrently, said apparatus comprising a first binary adder for producing from said applied trains a first sum pulse train of binary pulse groups, each group representing a sum digit corresponding in denominational significance to the applied digits; a filler generator for generating a single train of binary pulse groups representing filler digits, a filler digit being represented in binary code as the difference between the denominational radix of the applied digits and one more than the highest value which may be represented by a single pulse group; a second binary adder operated concurrently with said first adder for producing a second sum pulse train of binary pulse groups each group representing the sum of a digit represented by a group of said first sum pulse train and the filler digit of like denominational significance; indicating means operated in response to the occurrence of a carry from said second binary adder; gating means operative to selectively read out from said first adder and said second adder like denominational groups of said first and second sum pulse trains; means responsive to the operation of said indicating means at the end of a group for controlling the operation of said gating means such that a pulse group of said second sum pulse train is read out in response to the operation of said indicating means and a pulse group of said first sum pulse train is read out in response to non-operation of said indicating means and means operated in response to the operation of said indicating means at the end of a pulse group for correcting the value of the next following pulse group digit representation produced by both adders by the addition of one.

3. Electronic apparatus for adding together two value representing serial trains of binary pulse groups applied thereto, each group representing a digit in a single denomination of a notation having a radix greater than two, two succeeding denominations having different radices and groups representing digits of like denominational significance being applied concurrently, said apparatus comprising a first binary adder for producing from said applied trains a first sum pulse train of binary pulse groups each group representing a sum digit of corresponding denominational significance to the applied digits; a filler generator for generating a single train of binary pulse groups representing filler digits concurrently with the application of the applied digit representing groups, a filler digit having a value equal to the difference between the denominational radix of the applied digit and one more than the highest value which may be represented by a single group of binary pulses; a second binary adder operated concurrently with said first adder for producing a second sum pulse train of binary pulse groups each representing the sum of a digit represented by a group of said first sum pulse train and the filler digit of like denominational significance; indicating means operated in response to the occurrence of a carry from said second binary adder; gating means operative to selectively read out from said first adder and said second adder like denominational groups of said first and second sum pulse trains; means responsive to the operation of said indicating means at the end of a group for controlling the operation of said gating means in accordance with whether or not the indicating means is operated such that a pulse of said second sum pulse train is read out in response to operation of said indicating means and a pulse group of said first sum pulse train is read out in response to non-operation of said indicating means and means operated in response to the operation of said indicating means at the end of a pulse group for correcting the value of the next following pulse group digit representation produced by both adders by the addition of one.

4. Electronic apparatus for adding together two value representing serial trains of binary pulse groups applied thereto each group representing a digit in a single denomination of a notation having a radix greater than two, groups representing digits of like denominational significance being applied concurrently, said apparatus comprising a first binary adder; a first carry store for said first adder for concurrently applying groups representing digits of like denominational significance to said first adder; a second binary adder; a second carry store for said second adder; a filler generator for generating a single train of binary pulse groups representing filler digits concurrently with the application of the applied digit representing groups, a filler digit having a value equal to the difference between the denominational radix of the concurrently applied digits and one more than the highest value which may be represented by a single pulse group; means for applying the filler train and a sum digit representing train derived from said first adder to said second adder concurrently with the application of digit representing groups of like denominational significance to said first adder; gating means for selectively reading out pulse groups from said first and second adders representing sum digits of like denominational significance; means for controlling said gating means, the control means being operatively connected to said carry stores and being rendered effective in response to the registration of a carry by said second carry store to control said gating means to read out a sum pulse group from said second adder and controlling said gating means to read out a pulse group from said first adder in the absence of a carry registration by said second carry store and means responsive to the registration of a carry by said second carry store to condition said first carry store to register a carry.

5. Electronic apparatus for adding together two value representing serial trains of binary pulse groups applied thereto, each group representing a digit in a single denomination of a notation having a radix greater than two, groups representing digits of like denominational significance being applied concurrently, said apparatus comprising a first binary adder for producing from said applied trains a first sum pulse train of binary pulse groups, each group representing a sum digit of corresponding denominational significance to the applied digits; a filler generator for generating a single train of binary pulse groups representing filler digits concurrently with the application of the applied digit representing groups, a filler digit having a value equal to the difference between the denominational radix of the applied digits and one more than the highest value which may be represented by a single group of binary pulses; a second binary adder operated concurrently with said first adder for producing a second sum pulse train of binary pulse groups each representing the sum of a digit represented by a group of said first sum pulse train and the filler digit of like denominational significance; a first carry store for said first adder; a second carry store for said second adder; first delay means connected to the sum output of said first adder; a first gate connected to said first delay means; a second delay means connected to the sum output of said second adder; a second gate connected to said second delay means; gate control means operatively connected to said carry stores and rendered effective in response to the registration of a carry by said second carry store, the gate control means being operatively connected to said first and second gates to open said second gate when said control means is effective and to open said first gate when said control means is ineffective and means responsive to the registration of a carry by said second carry store to condition said first carry store to register a carry.

6. Electronic apparatus for adding together two value representing serial trains of binary pulse groups applied thereto, each group representing a digit in a single denomination of a notation having a radix greater than two, groups representing digits of like denominational significance being applied concurrently, said apparatus comprising a first binary adder for producing from said applied trains a first sum pulse train of binary pulse groups, each group representing a sum digit of corresponding denominational significance to the applied digits; a filler generator for generating a single train of binary pulse groups representing filler digits concurrently with the application of the applied digit representing groups, a filler digit having a value equal to the difference between the denominational radix of the applied digits and one more than the highest value which may be represented by a single group of binary pulses; a second binary adder operated concurrently with said first adder for producing a second sum pulse train of binary pulse groups each representing the sum of a digit represented by a group of said first sum pulse train and the filler digit of like denominational significance; a first carry store for said first adder; a second carry store for said second adder; first delay means connected to the sum output of said first adder; a first gate connected to said first delay means; second delay means connected to the sum output of said second adder; a second gate connected to said second delay means; a control trigger switchable between first and second states and operatively connected to said first and second gates for opening said first gate and said second gate when said trigger is in the first and second state respectively; control means for switching said trigger between the first and second state operatively connected to said carry stores and effective when said second carry store is storing a carry at the end of a group to switch said trigger to said second state and effective when said carry store is not storing a carry at the end of a group to switch said trigger to said first state and means responsive to the storage of a carry by said second carry store to condition said first carry store to store a carry.

7. Apparatus as set forth in claim 6 in which said first and second delay means each provide a delay equal to the time required for the application of a single pulse group.

8. Apparatus as set forth in claim 7 in which said control means comprises a gating arrangement connected between said carry stores and said control trigger and means for applying end of group timing signals to prime said gating arrangement.

9. Apparatus as set forth in claim 8 in which said means for conditioning said first carry store in response to the storage of a carry by said second carry store comprises a gating arrangement connected between said first and said second stores and means for applying end of group timing signals to prime said gating arrangement.

References Cited in the file of this patent

UNITED STATES PATENTS

| | | |
|---|---|---|
| 2,886,241 | Spaulding et al. | May 12, 1959 |
| 2,898,042 | Womersley et al. | Aug. 4, 1959 |

FOREIGN PATENTS

| | | |
|---|---|---|
| 738,605 | Great Britain | Oct. 19, 1955 |